(12) United States Patent
Schumann

(10) Patent No.: US 8,312,842 B2
(45) Date of Patent: Nov. 20, 2012

(54) FEEDER APPARATUS WITH ELASTIC SECURING MEMBER

(76) Inventor: James A. Schumann, Hawley, MN (US)

(*) Notice: Subject to any disclaimer, the term of this patent is extended or adjusted under 35 U.S.C. 154(b) by 1000 days.

(21) Appl. No.: 10/869,491

(22) Filed: Jun. 16, 2004

(65) Prior Publication Data

US 2005/0045109 A1    Mar. 3, 2005

(51) Int. Cl.
*A01K 39/01* (2006.01)
(52) U.S. Cl. ................................ 119/52.2; 119/57.8
(58) Field of Classification Search .......... 119/52.2, 119/52.3, 57.8, 57.9
See application file for complete search history.

(56) References Cited

U.S. PATENT DOCUMENTS

| | | | |
|---|---|---|---|
| 2,875,729 A | | 3/1959 | Gibson |
| 3,083,687 A | * | 4/1963 | Slaven .................... 119/52.2 |
| 3,090,354 A | | 5/1963 | Merritt et al. |
| 3,117,554 A | * | 1/1964 | Taylor ..................... 119/52.3 |
| 3,316,884 A | | 5/1967 | Viggars |
| 4,732,112 A | | 3/1988 | Fenner et al. |
| 4,821,681 A | * | 4/1989 | Tucker ..................... 119/51.01 |
| 5,033,411 A | | 7/1991 | Brucker |
| 5,195,459 A | * | 3/1993 | Ancketill ................. 119/57.9 |
| 5,445,109 A | * | 8/1995 | Gray et al. ............... 119/57.9 |
| 5,479,879 A | | 1/1996 | Biek |
| 5,568,789 A | * | 10/1996 | Koenig et al. ........... 119/57.9 |
| 5,682,835 A | | 11/1997 | Walter et al. |
| 5,690,056 A | * | 11/1997 | Korb ........................ 119/52.3 |
| 5,829,383 A | * | 11/1998 | Blanding ................. 119/52.3 |
| 6,253,707 B1 | * | 7/2001 | Cote ........................ 119/57.9 |
| 6,332,427 B1 | * | 12/2001 | Coulson .................. 119/57.8 |
| 6,349,673 B1 | * | 2/2002 | Schumann ............... 119/52.2 |
| 6,463,878 B1 | * | 10/2002 | Moody .................... 119/57.9 |
| 6,662,746 B2 | * | 12/2003 | Laske, Jr. ................ 119/57.8 |
| 6,679,197 B1 | * | 1/2004 | Reilly ...................... 119/57.8 |
| 6,945,192 B2 | * | 9/2005 | Cote ........................ 119/57.9 |

* cited by examiner

*Primary Examiner* — David Parsley
(74) *Attorney, Agent, or Firm* — Hamre, Schumann, Mueller & Larson, P.C.

(57) ABSTRACT

A bird feeder apparatus, which utilizes an elastic member to removably secure a removable bottom end portion to a feed storage chamber of the feeder apparatus. In one embodiment, the removable bottom end portion is a feed tray and in another embodiment the removable bottom end portion is a bottom end cap of the feed storage chamber.

5 Claims, 14 Drawing Sheets

FEEDER APPARATUS WITH ELASTIC SECURING MEMBER

BACKGROUND OF THE INVENTION

1. Field of the Invention

The present invention relates to a feeder apparatus, which utilizes an elastic member to removably secure in position various components of the feeder apparatus and retain the feeder apparatus in an assembled configuration.

2. Description of related Art

A feeder such as a bird feeder, which by its nature is constructed of many types of material, requires disassembly numerous times throughout its life cycle for refilling the feed chamber with feed and for cleaning the feeder. For example, filling the feed chamber with feed typically requires that the top or bottom components of the feeder to be removed from the feed chamber to allow access to the feed chamber during the filling process.

Friction fit is a common method of attaching or securing components of a bird feeder to the feed chamber. The drawback of using friction fit is that a close tolerance is required at the time of production and must be maintained in order to insure a proper friction fit. Furthermore, friction fits become less reliable when attaching two different types of materials such as wood and plastic.

Another approach to securing components of a bird feeder is using a threaded attachment mechanism such a screw or the like to attach the components. There are numerous disadvantages to using such an attachment mechanism; e.g., it is time consuming to unthread such an attachment; the threaded attachment can be lost with use, etc.

The present invention solves many of the above noted problems associated with the prior art devices.

The applicant's U.S. Pat. No. 6,349,673 discloses a bird feeder having an elastic member connected to a pair of rods so that the rods resiliently engage with a feed tray and held the feed tray onto the feed chamber. The present invention offers numerous advantages and patentable features over this patent.

SUMMARY

The present invention relates to feeder apparatuses and methods of removably securing the components of a feeder apparatus in an assembled configuration by utilizing an elastic member.

In one embodiment, the present utilizes an elastic member to removably secure a bottom end portion to a feed storage chamber of the feeder apparatus. In one embodiment, the removable bottom end portion is a feed tray and in another embodiment the removable bottom end portion is a bottom end cap of the feed storage chamber.

In another embodiment, elastic member to removably secure a top end portion of the feeder apparatus. In one embodiment this is a top end cap of the feed storage chamber.

In some embodiments both the bottom end portions and the top end portions might be removable.

An advantage of one embodiment of the invention is that it enables readily dissembling/assembling of the feeder apparatus, particularly for refilling the chamber and cleaning while in use.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying description, in which there is described a preferred embodiment of the invention.

BRIEF DESCRIPTION OF DRAWINGS

Referring now to the drawings in which like reference numbers indicate corresponding parts throughout.

DETAILED DESCRIPTION OF THE PREFERRED EMBODIMENTS

Figure 1A:
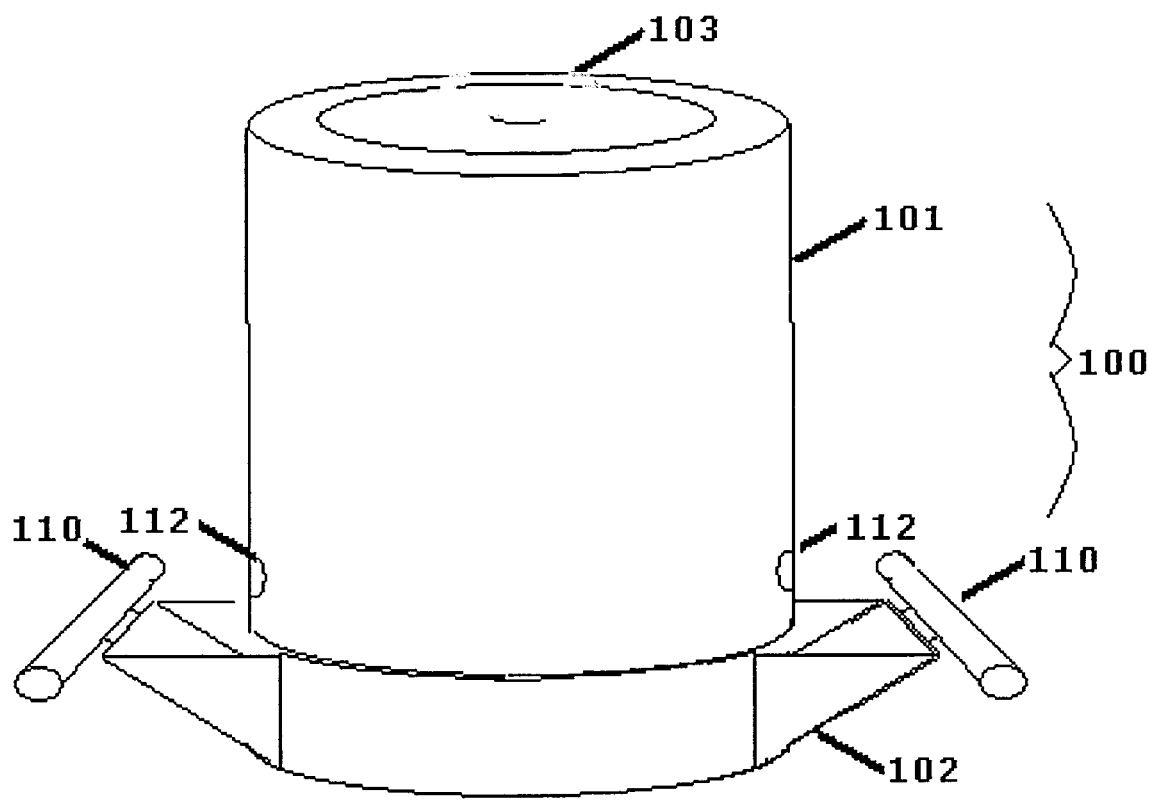
FIG. 1A is a perspective view of one embodiment of a feeder apparatus in accordance with the principles of the present invention.
Figure 1B:
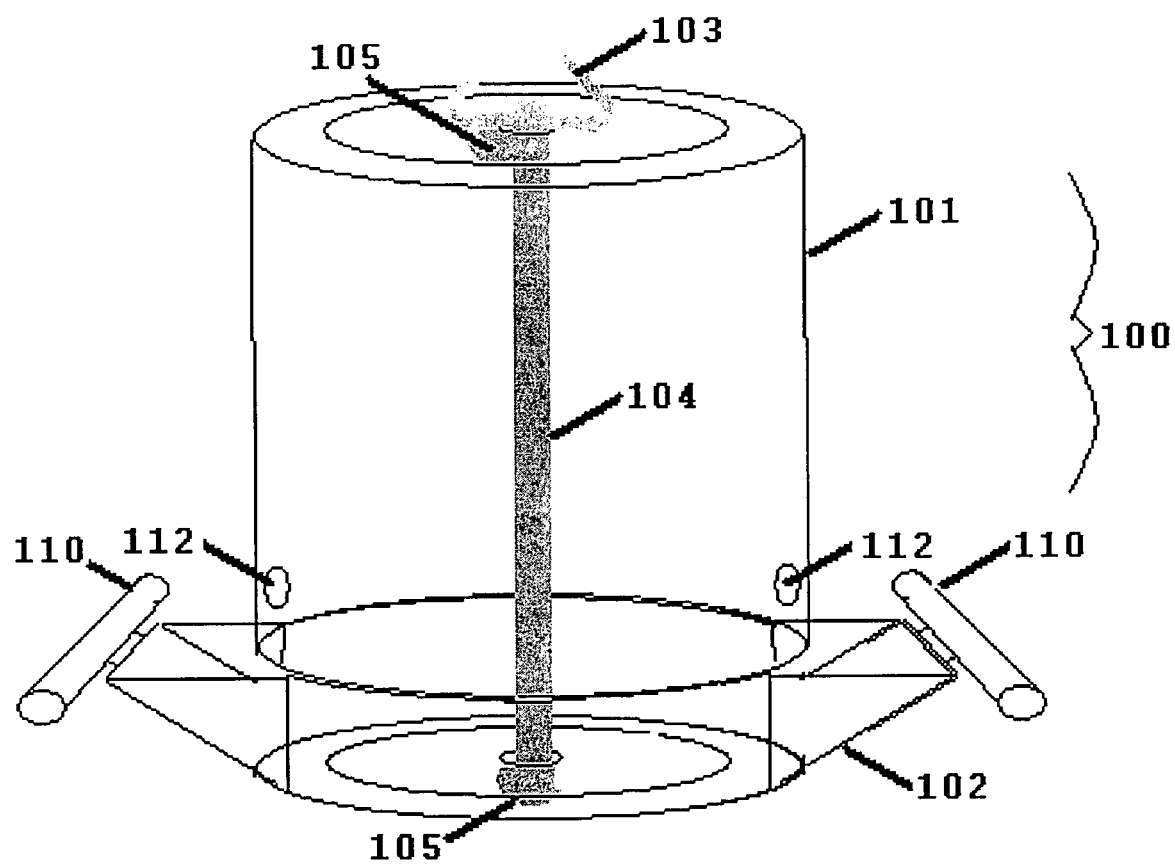
FIG. 1B is a view of the embodiment shown in FIG. 1A showing the internal elastic member.
Figure 1C:
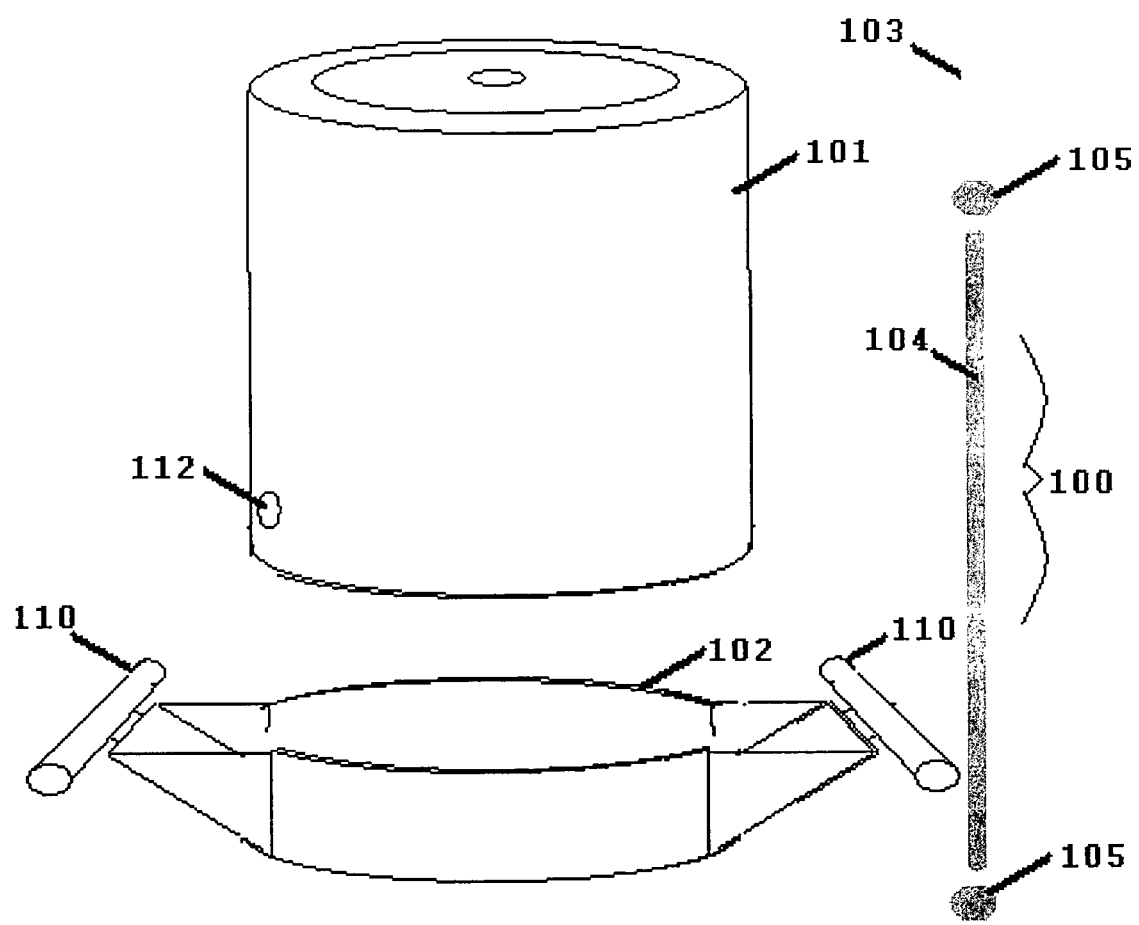
FIG. 1C is an exploded view of the embodiment shown in FIG. 1A.

With reference to the drawings, there is illustrated in FIGS. 1A-C a first embodiment of a bird feeder 100 in accordance with the principles of the present invention. The bird feeder is shown in its assembled configuration in FIG. 1A, in FIG. 1B showing selected internal features, and in an exploded view in FIG. 1C. The feeder apparatus 100 includes a feed storage chamber 101, a feed tray 102 with dowels 110 to serve as a perch, an elastic member 104, two knots or other restraining devices 105 on the elastic member 104, and feed distribution holes 112. A hanging ring 103 or other suitable structure may be disposed on the top of the feed storage chamber 101, which can be used to hang the feeder apparatus 100 from a tree branch or other object.

In this embodiment, a bottom end portion of the feeder apparatus is the feed tray 102. However, as disclosed below the bottom end portion might take on other configurations and arrangements such as an end cap of the feed storage chamber 101.

As shown in FIG. 1B, the feed storage chamber 101 and the feed tray 102 of the feeder apparatus 100 is held together by the elastic member 104. The elastic member 104 is suitably secured to the top of the feed storage chamber 101 and to the feed tray 102. In the assembled state, the elastic member is taught so as to force the feed tray 102 toward the bottom of the feed storage chamber 101 and removably secure the feed tray 102 to the bottom of the feed storage chamber 101. The elastic member 104 is suitably restrained proximate the top of the feed storage chamber 101 and proximate the bottom of the feed tray 102 by the knots or other restraining devices 105.

In the preferred embodiment, knots 105 are tied in the elastic member 104 to restrain the elastic member 104. However other restraining devices 105 might be attached to the elastic member 104 such as a swaged fitting end stop, terminal fastener, a large staple, etc. These are but a few of the different types of restraining devices that might be used. The elastic member 104 is preferably an elastic cord and more preferably an elastic member of uniform tension as it is stretched and most preferably a multi strand shock cord. However, it will be appreciated that the elastic member 104 can be a variety of different types of elastic members such as a bungy cord, rubber band, etc. and made of a variety of materials; for example, rubber, fabric, etc. and have a variety of shapes; for example, strings, bands, webbing, etc.

To assemble the preferred embodiment shown, a restraining device 105 is placed at one end of the elastic member 104; e.g., tying a knot proximate the one end of the elastic member 104. An opposite end of the elastic member 104 is routed from inside the feed storage chamber 101 through an aperture defined in the top of the feed storage chamber 101, through the hanging ring 103, and back through the aperture in the top of the feed storage chamber 101. The knot or restraining device 105 in the embodiment shown is larger than the aperature in the top of the feed storage chamber 101. The elastic member 104 is then routed downward and through an aperture of the feed tray 102. A restraining device 105 is placed at second end of the elastic member 104; e.g., tying a knot proximate the second end of the elastic member 104. The knot or restraining device 105 is larger than the aperature in the bottom of the feed tray 102 so as to restrain the elastic member 104 from pulling back through the aperture. In the preferred embodiment shown the knot or restraining device 105 engages a bottom surface of the feed tray 102. It will be appreciated the aperature in the feed tray 102 might be of varying size so the knot or restraining device 105 is suitably restrained in the aperature itself. The restraining devices 105 must be spaced apart such that the elastic member 104 is under tension when the feeder apparatus 100 is assembled so as to exert sufficient force to secure the feed tray 102 to the feed storage chamber 101 during use so that the feed tray 102 does not separate from the feed storage chamber 101 while the feeder apparatus 100 is hanging from an object and birds are feeding on it. It will be appreciated that changes may be made in the invention in accordance with the principles of the present invention whereby the elastic member 104 is retained proximate the top end of the feed storage chamber 101 and proximate the lower end portion of the feed storage chamber which in this embodiment is the feed tray 102.

In use when filling and cleaning the feeder apparatus 100, the feed tray 102 can be separated from the feed storage chamber 101 by over coming the resistance of the elastic member 104 and thereby stretching the elastic member 104 so as allow removal of the feed tray 102 by simply pulling down on the feed tray 102 and moving it away from the bottom of the feed storage chamber 101 during the filling process. The feed tray 102 typically will remain attached to the elastic member 104 during the filling process. However, if for cleaning or other reasons it is desired to disassemble the feeder apparatus 100, the restraining device 105 can be readily removed and the feeder apparatus 100 disassembled.

If the hanging ring 103 is not used, the elastic member 104 can be retained at the top of the feed storage chamber 101 by the restraining device 105 being suitably positioned at the top of the feed storage chamber 101. In the preferred embodiment the hanging ring 103 is shown as a triangular shaped ring however it will be appreciate that other configurations and shapes might be used; for example, circular, elongated, etc.

In one embodiment, the feed storage chamber might be made from a reused plastic container, such as a PEPSI soft drink bottle, by cutting off the top of the bottle. The top of the bottle rests on the feed tray 102 and the bottom of the bottle functions as the top of the feed storage chamber. The size of the feeder apparatus 100 is varied by selecting different sizes of bottles. Preferably a clear plastic bottle is used. It will be appreciated however, that the feed storage chamber 101 can be made in any number of varying arrangements and configurations and of varying materials. One popular design not shown but which might be used is a feed storage chamber 101 having a long slender clear plastic tube.

The feeder apparatus 100 might be put on display and sold and/or shipped with feed in the feed storage chamber 101. The feed distribution holes 112 are suitably sealed, such as by a piece of removable adhesive tape, so the feed does not run out of the feed distribution holes 112 while on display or in shipment. In the preferred embodiment shown, feed falls out the feed distribution holes 112 and into the feed tray 102. In the preferred embodiment he feed storage chamber 101 is sealed from the feed tray 102 such that feed does not fall from the feed storage chamber 101 directly into the feed tray 102. Rather feed falls from the feed distribution holes 112 into the feed tray 102 as the birds feed. The birds pull the feed from the feed distribution hole 112 as they eat. This starts a temporary flow of seeds into the feed tray 102. Varying sized feed distribution holes might be used for different types of feed. For the very small seeds an oblong hole might be used. For the larger seeds a round hole. Of course, in other embodiments, the feed tray 102 and the feed storage chamber 101 might be open to each other and in direct communication allowing feed to flow into the feed tray 102 from the feed storage chamber 101.

In embodiments where feed falls directly from the feed storage chamber 101 into the feed tray 102, a cover might be used to cover the bottom end of the feed storage chamber 101 so the feed does not fall out into the feed tray 102 while on display or in shipment with seeds present in the feed storage chamber 101. In one embodiment, the cover might be cut and configured so as when inserted into the bottom of the feed storage chamber it provides a friction fit. The cover might be suitably attached by other methods such glue, tape, etc.

Various indicia including custom advertising or promotional information might be put on the feed tray 102 and/or bottom end cap 101b and/or on the top end cap 101a. For example, a resort might want to sell the feeders with their name and contact information on the feeder apparatus 100. Suitable methods can be used to apply this indicia. In some embodiments these components are made from wood although other materials might be used including but not limited to plastic, etc. One way to apply the indicia to these components is to print the indicia using a suitable printer such as an ink jet printer or laser printer directly onto a thin sheet of wood laminate material such as a birch paper back veneer. This material is then cut to size and suitably adhered to the surface areas of the feeder where desired by for example using an external wood glue or external double faced tape. This would allow feeders to even be customized with guest/customer names at the point of sale.

In a preferred embodiment of the invention, promotional or other materials might be put inside the feeder apparatus 100 when it is sold with feed such as bird seed in the feed storage chamber 101. For example, a business card or other information on how to reorder the feed and/or feeder apparatus 100 might be placed in the feed. Information on birds, feed in general, a resort where guests are staying, etc. might placed in the feed storage chamber 101 when it is on display and/or shipped with seed. In one embodiment, figurines of different birds might be place in the feed chamber filled with seed. There might be a collection of such figurines. In still another embodiment, a prize might be included in the feed.

Figure 2:
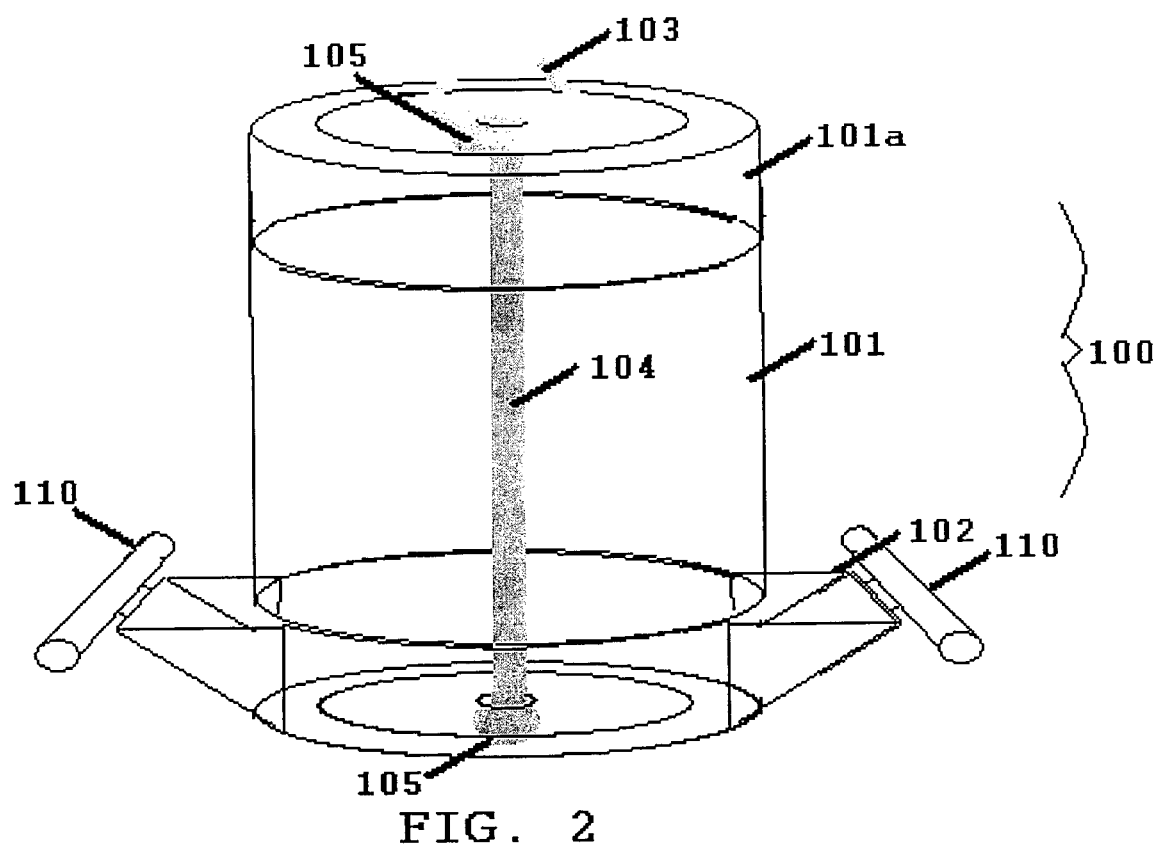
FIG. 2 is a perspective of another embodiment of a feeder apparatus in accordance with the principles of the present invention.

FIG. 2 illustrates an alternative embodiment of a feeder apparatus 100. In this embodiment, the feed storage chamber 101 includes a feed storage chamber top end cap 101a, which is removable. As with the other embodiments, the feed storage chamber top end cap 101a, the feed storage chamber 101 and the feed tray 102 of the feeder apparatus 100 are held together by the elastic member 104. For filling and cleaning, either the feed storage chamber top end cap 101a and/or the feed tray 102 can be separated from the feed storage chamber 101 by over coming the elastic pull of the elastic member 104. In this embodiment, there are no feed distribution holes 112. The feed flows directly from the feed storage chamber 101 into the feed tray 102. It will be appreciated that the feed tray as with the embodiment of FIGS. 1A-1C, might also be sealed from the feed storage chamber 101 and feed distribution holes 112 used.

Figure 3:
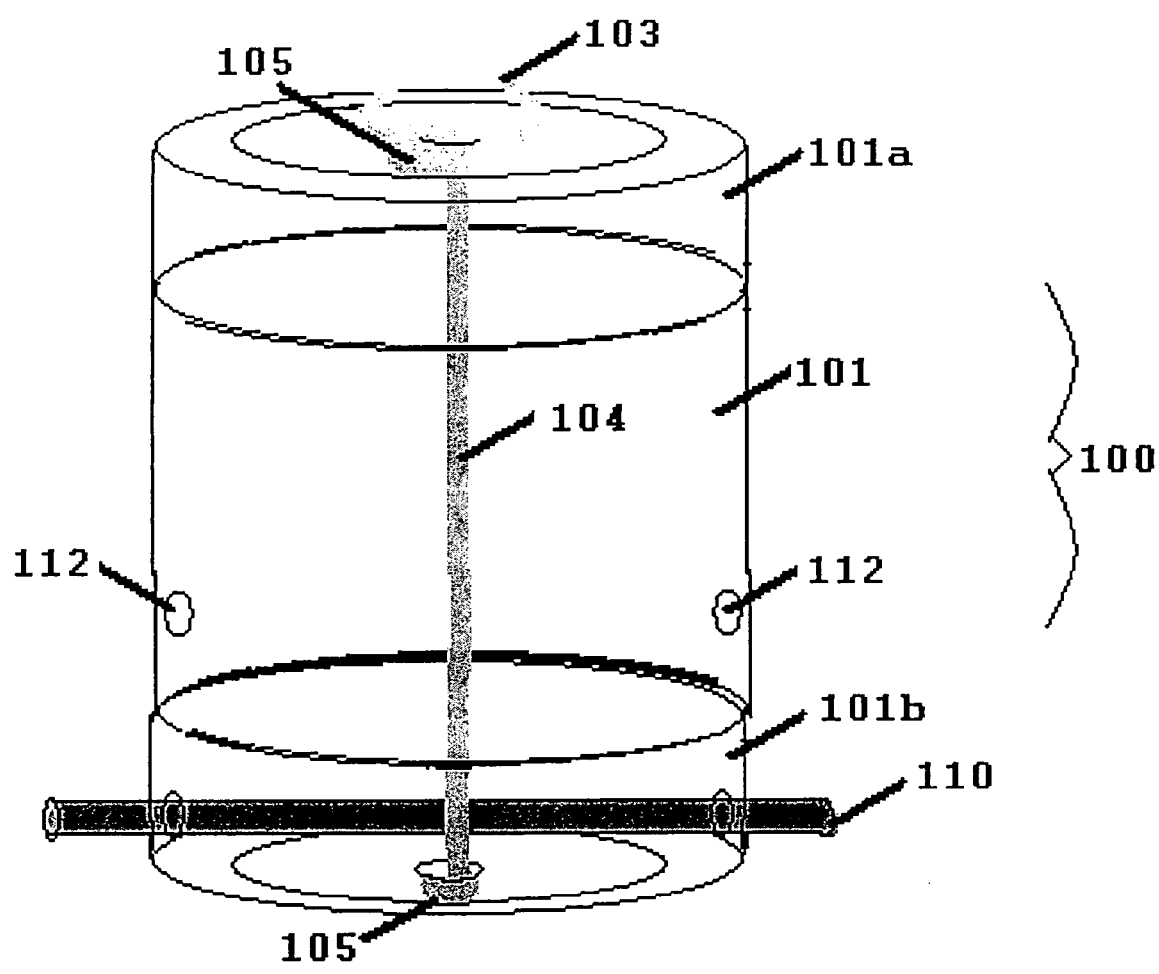
FIG. 3 is a perspective of another embodiment of a feeder apparatus in accordance with the principles of the present invention.

FIG. 3 illustrates a further embodiment of a feeder apparatus 100. In this embodiment, the feed storage chamber 101 includes the removable top end cap 101a and a removable bottom end cap 101b, which replaces the removable feed tray 102 of FIGS. 1A-1C. A perch dowel 110 is placed through the feed storage chamber bottom end cap 101b. Feed distribution holes 112, are placed in the side wall of the feed storage chamber 101. As with the other embodiments, the feed storage chamber top end cap 101a, the feed storage chamber 101 and the feed storage chamber bottom end cap 101b of the feeder apparatus 100 are held together by the elastic member 104. For filling and cleaning, the feed storage chamber top end cap 101a and/or the feed storage chamber bottom end cap 101b can be separated from the feed storage chamber 101 by over coming the elastic pull of the elastic member 104.

Figure 4:
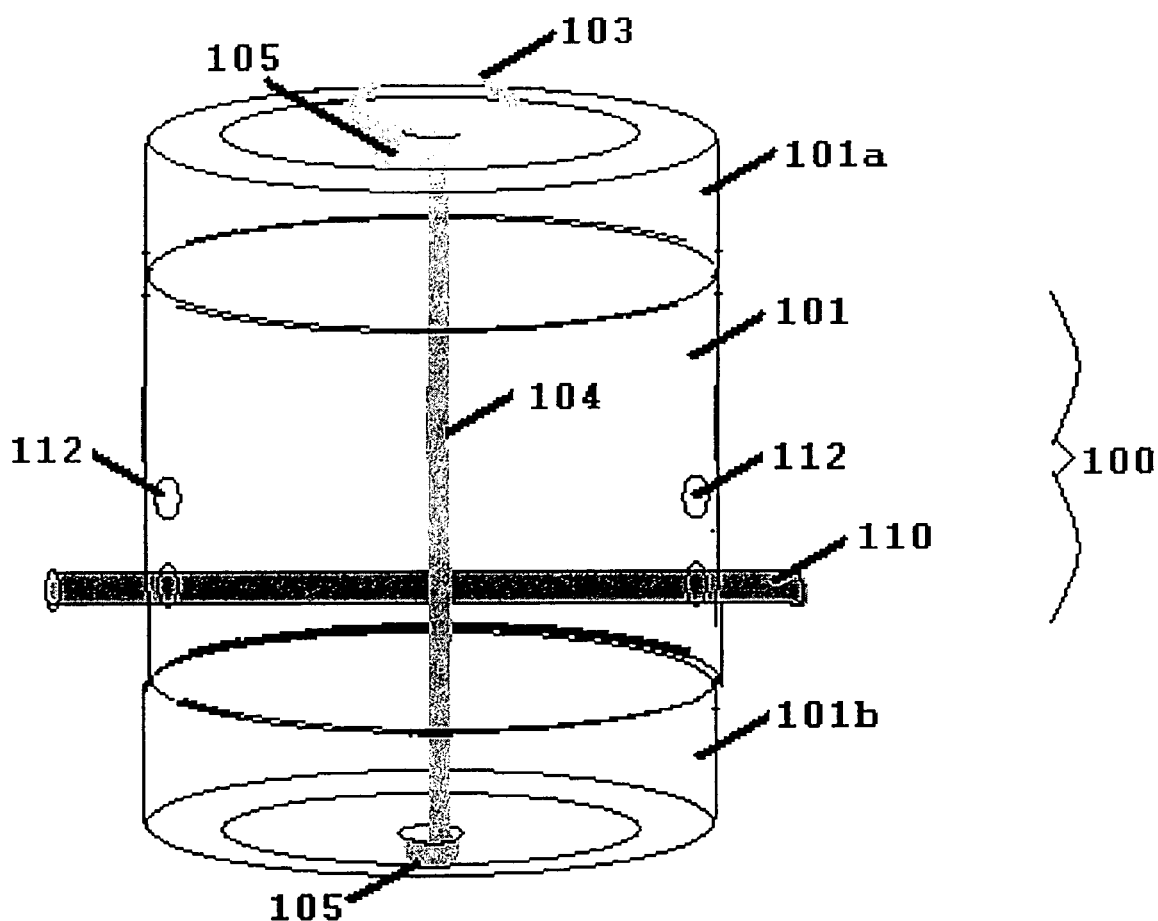
FIG. 4 is a perspective of another embodiment of a feeder apparatus in accordance with the principles of the present invention.

FIG. 4 illustrates a further embodiment of a feeder apparatus 100. In this embodiment, the perch dowel 110 is placed through the feed storage chamber 101 as opposed to the removable end cap 101b. As with the other embodiments, the feed storage chamber top end cap 101a, the feed storage chamber 101 and the feed storage chamber bottom end cap 101b of the feeder apparatus 100 are held together by the elastic member 104. For filling and cleaning, the feed storage chamber top end cap 101a and/or the feed storage chamber bottom end cap 101b can be separated from the feed storage chamber 101 by over coming the elastic pull of the elastic member 104.

Figure 5:
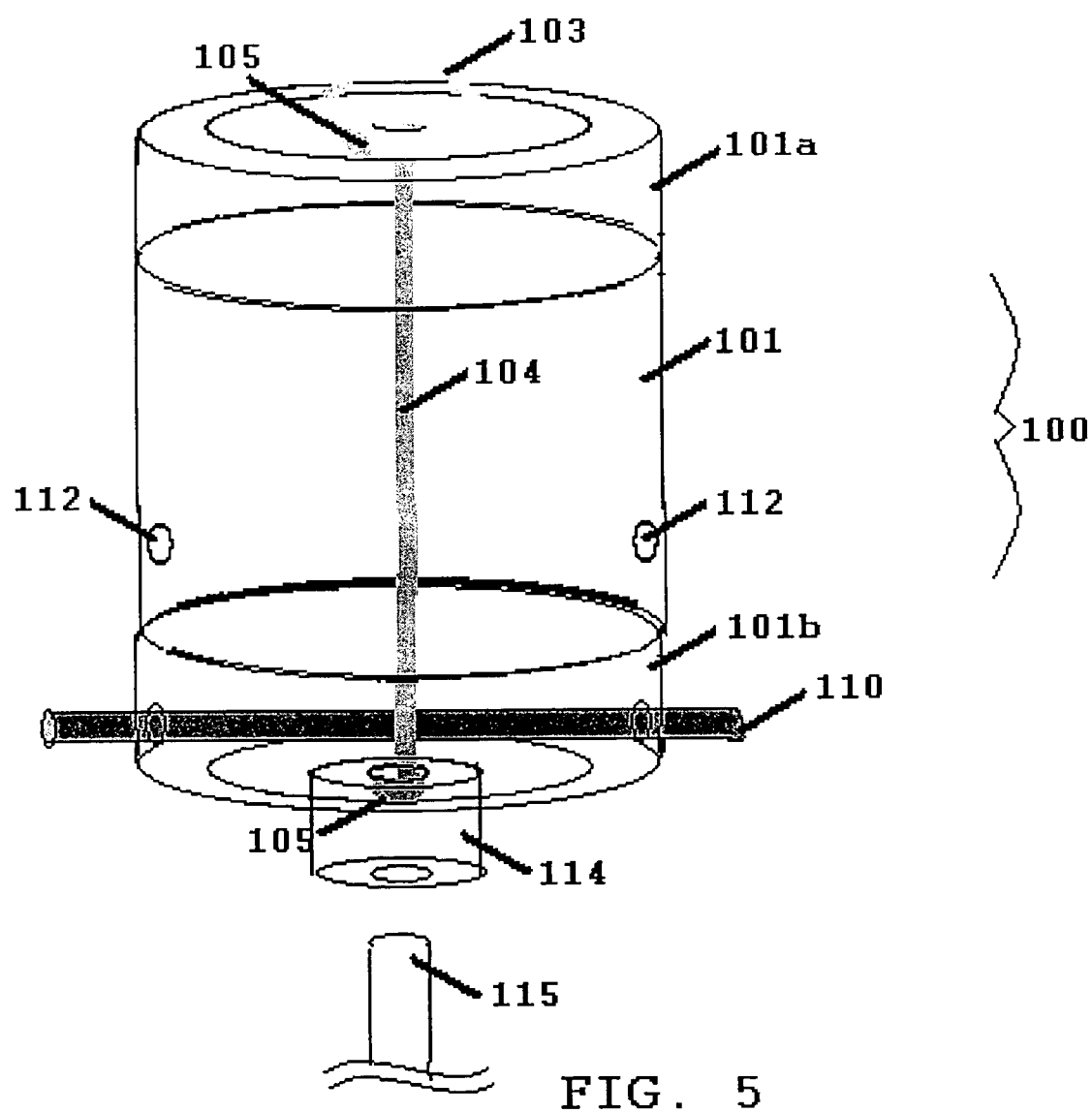
FIG. 5 is a perspective of another embodiment of a feeder apparatus in accordance with the principles of the present invention.

FIGS. 5 illustrates yet another embodiment of a feeder apparatus 100. A cylindrical support bracket 114 is disposed on the bottom of the feed storage chamber bottom end cap 101b, which can be used to sit the feeder apparatus onto a pole 115. The bracket 114 of the embodiment shown includes an aperature for receiving the pole 115. The aperature in the bottom surface of the bottom end cap might be enlarged to telescopically receive the bracket 114. As with the other embodiments, the feed storage chamber top end cap 101a, the feed storage chamber 101 and the feed storage chamber bottom end cap 101b of the feeder apparatus 100 are held together by the elastic member 104. For filling and cleaning, the feed storage chamber top end cap 101a and/or the feed storage chamber bottom end cap 101b can be separated from the feed storage chamber 101 by over coming the elastic pull of the elastic member 104.

Figure 6A:
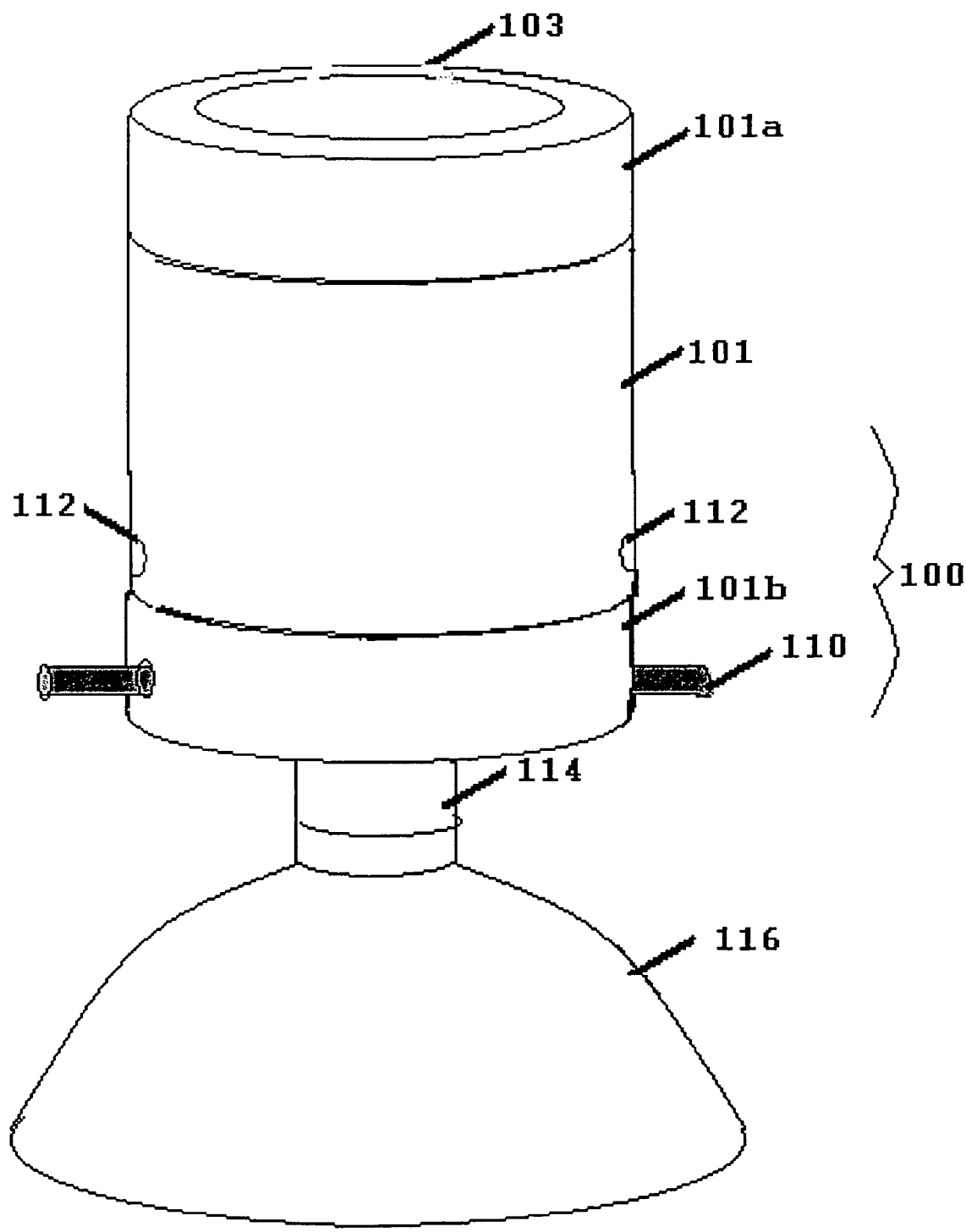
FIG. 6A is a perspective view of yet another embodiment of a feeder apparatus in accordance with the principles of the present invention.
Figure 6B:
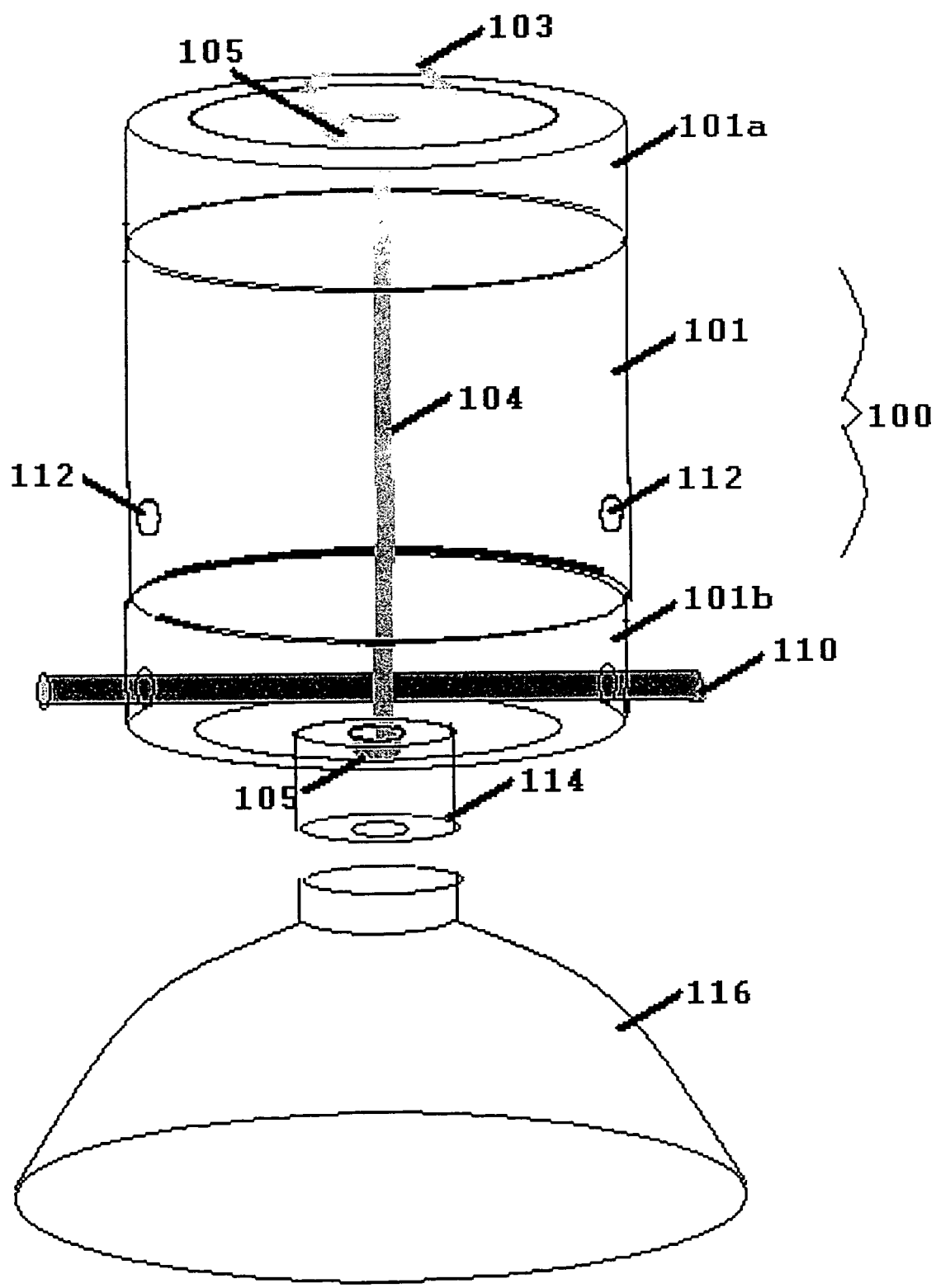
FIG. 6B is a view of the embodiment shown in FIG. 6A showing the internal elasctic member.
Figure 6C:
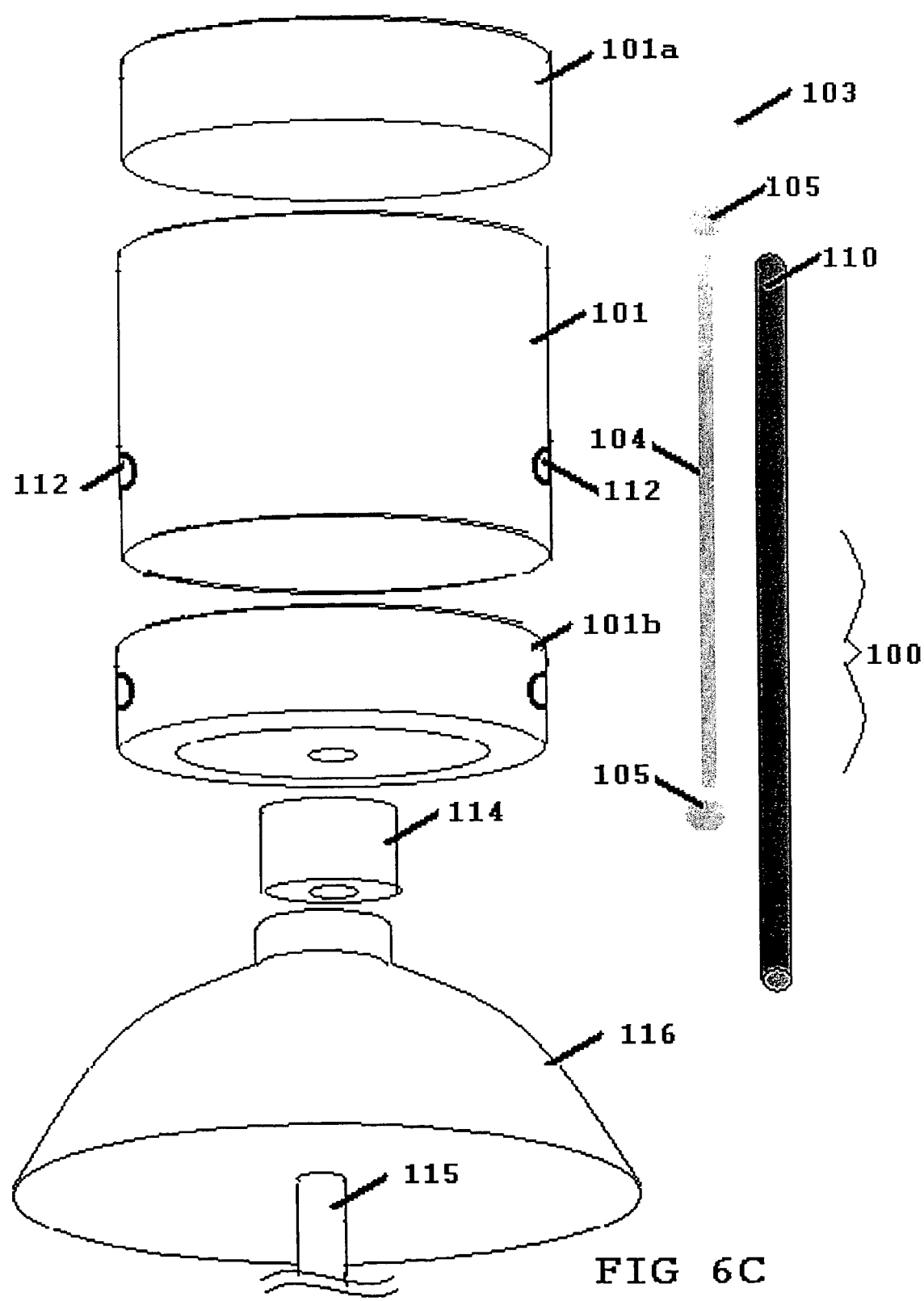
FIG. 6C is an exploded view of the embodiment shown in FIG. 6A.
Figure 6D:
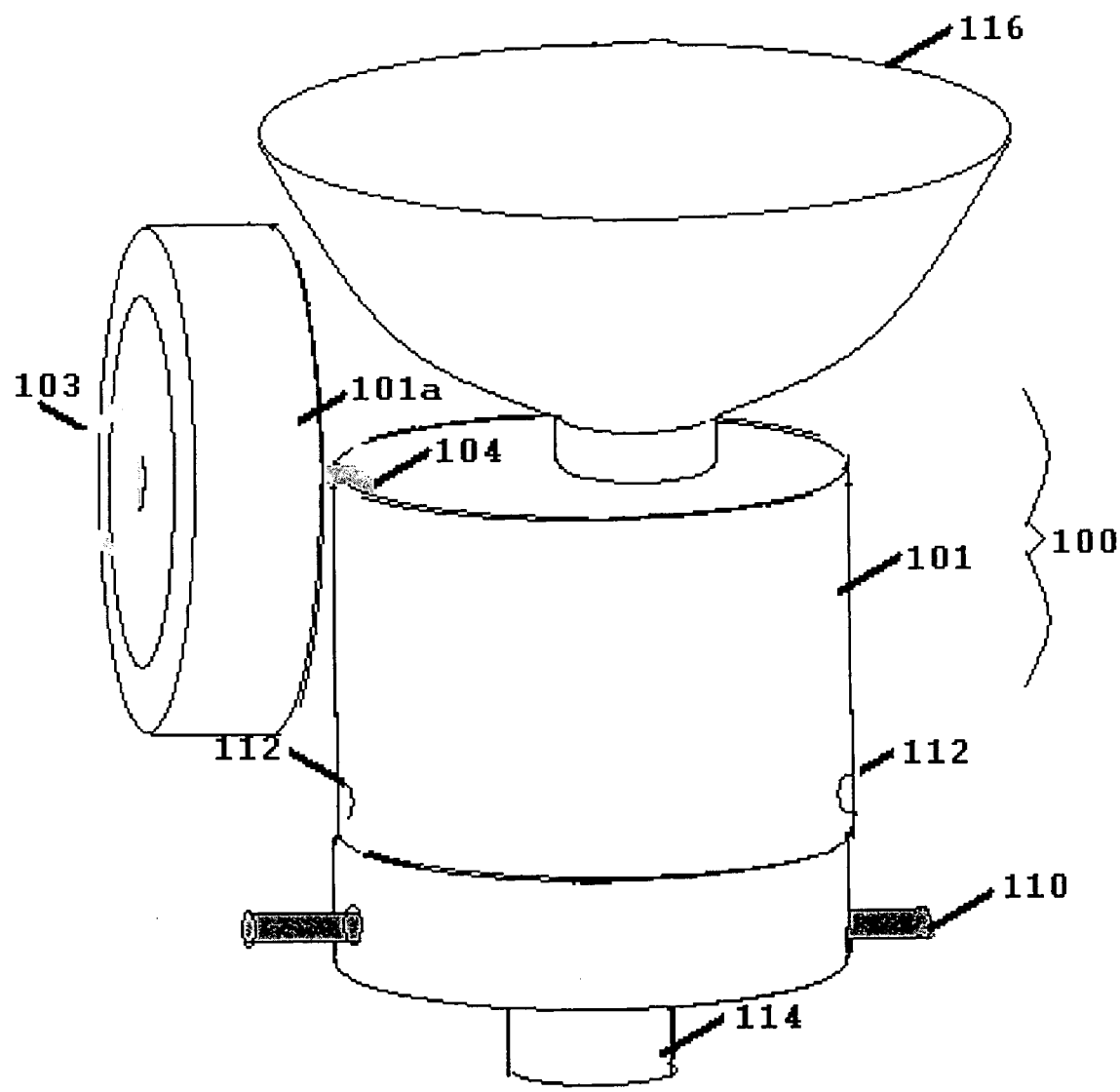
FIG. 6D is a perspective view of the embodiment shown in FIG. 6A illustrating the feeder configured for filling with feed.

FIGS. 6A-D illustrate another embodiment of a feeder apparatus 100. A rodent deterrent/funnel 116 is removably mountable on the support bracket 114. As with the other embodiments, the feed storage chamber top end cap 101a, the feed storage chamber 101 and the feed storage chamber bottom end cap 101b of the feeder apparatus 100 is held together by the elastic member 104. The rodent deterrent/funnel 116 may be suitably disposed at the bottom of the feed storage chamber bottom end cap 101b or the support bracket 114 which will restrict rodents and other small animals from accessing the feeder apparatus via the pole or stand. For filling and cleaning, the feed storage chamber top end cap 101a and/or the feed storage chamber bottom end cap 101b can be separated from the feed storage chamber 101 by over coming the elastic pull of the elastic member 104. FIG. 6D shows one way the rodent deterrent/funnel 116 may be used as a funnel to fill the feeder apparatus 100. In the embodiment shown the funnel 116 is telescopically attached to the bracket 114.

Figure 7A:
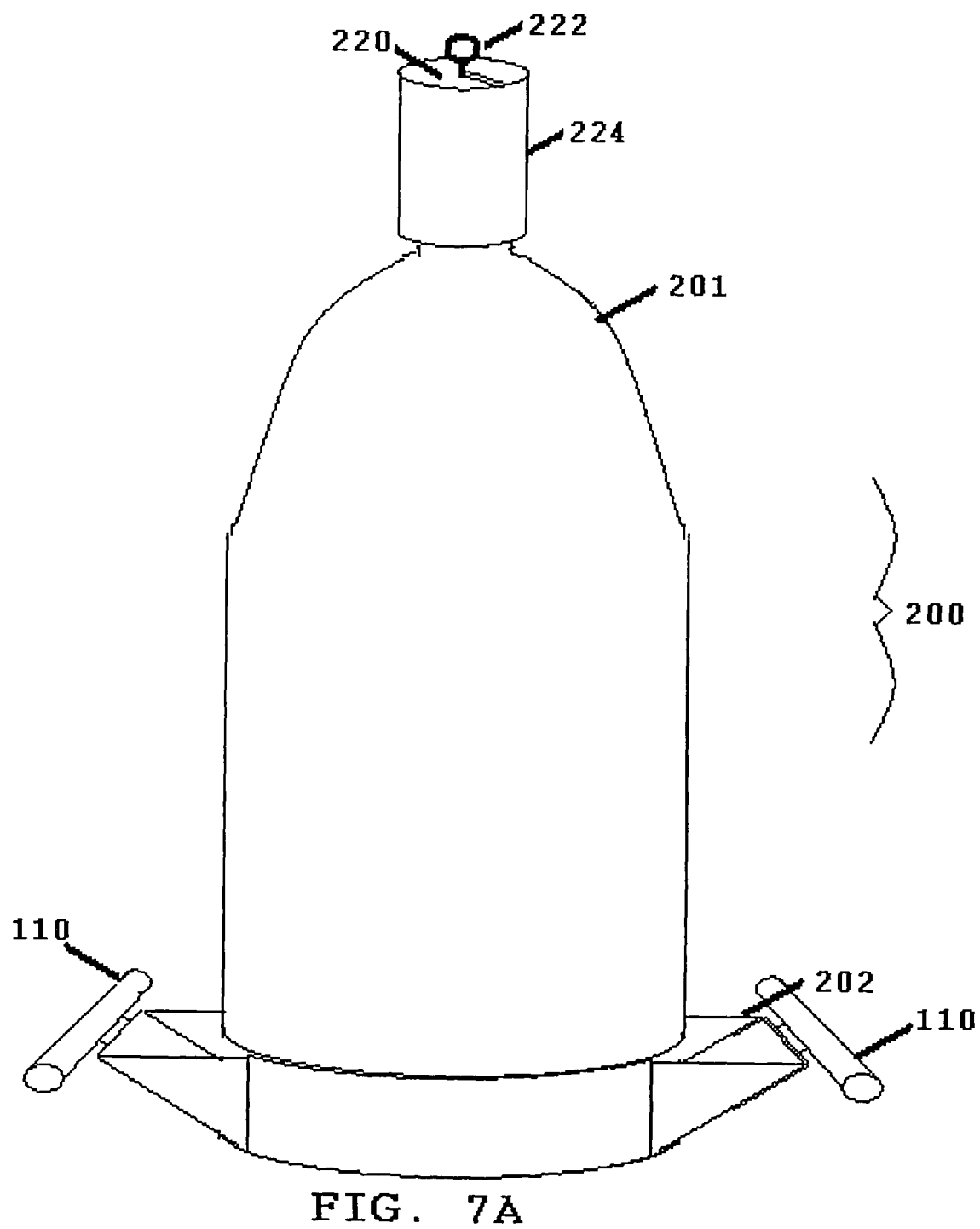
FIG. 7A is a perspective view of yet another embodiment of a feeder apparatus in accordance with the principles of the present invention.
Figure 7B:
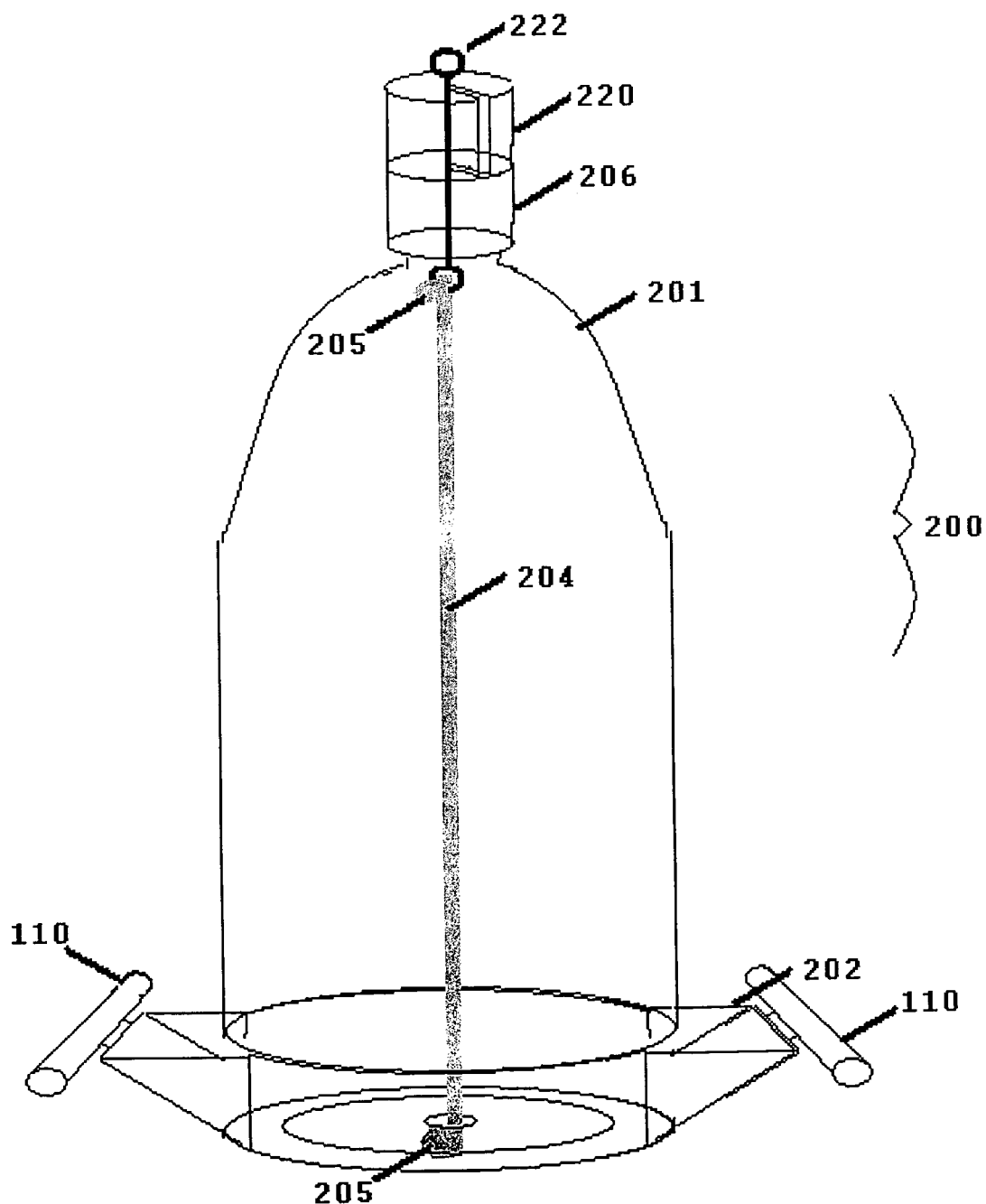
FIG. 7B is a view of the embodiment shown in FIG. 7A showing the internal elastic member.
Figure 7C:
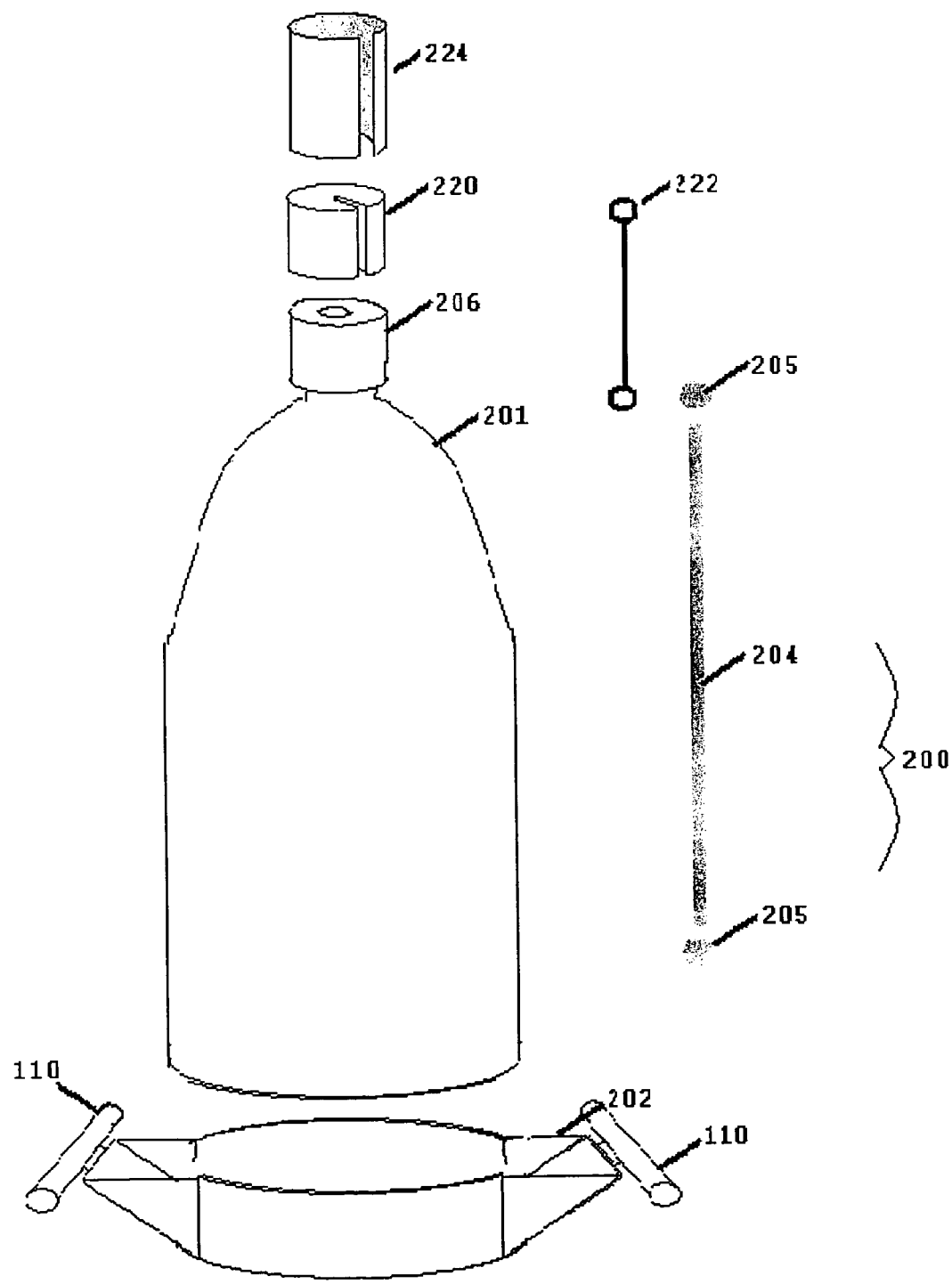
FIG. 7C is an exploded view of the embodiment shown in FIG. 7A.

FIGS. 7A-C illustrate a feeder apparatus 200. The feeder apparatus 200 includes a reused container, such as a PEPSI beverage bottle, as the feed storage chamber 201, a feed tray 202, elastic member 204, and two knots or other restraining devices 205.

The feed storage chamber 201 and the feed tray 202 of the feeder apparatus are held together by the elastic member 204 in a manner similar to the above embodiments. For filling and cleaning, the feed tray 202 and/or cap 206 can be separated from the reused container 201 by over coming the elastic pull of the elastic member 204.

In this embodiment, the bottom of the reused container is cut off. It will be appreciated that other containers might be used and that the feeder apparatus 200 may take on any number of varying arrangements and configurations and of varying materials.

The reused container cap 206 might be the container's normal cover or cap with a hole defined in it for receipt of the elastic member 204. However, in this embodiment the cap 206 is shown to include a cylindrical member 220 such as a piece of wood. A radial cut is made from the periphery to the center of the cylindrical member 220. A metal fastener 222 is then inserted into the radial cut with a top end projecting above the cap 206 (enables the feeder to be hung from an object if desired) and a bottom end projecting below the cap 206 and providing for attachment of the elastic member 204. A flexible wrapper 224 might be placed around the cylinder 220 with suitable indicia thereon. This wrapper might be made from a think sheet of laminated wood product as noted above and contain suitable indicia printed thereon. In this embodiment, the cylindrical member 220 sits on the cap 206; however, the cap 206 might be entirely replaced by the cylindrical member 220.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A feeder apparatus, comprising:
a storage chamber having a cover portion with a top surface and at least one sidewall;
a bottom end portion; and
an elastic member removably securing the cover portion of the storage chamber, the sidewall of the storage chamber and the bottom end portion to each other by an elastic resistance of the elastic member, the elastic member being attached at a first end directly to the top surface of the cover portion of the storage chamber and at a second end to the bottom end portion; the elastic member extending through a hole defined in the top surface of the cover portion of the storage chamber and being restrained directly at the top surface of the cover portion by a first restraining device, the first restraining device being in direct contact with the top surface of the cover portion and proximate the first end of the elastic member so as to prevent the first end of the elastic member from sliding through the hole in the top surface of the cover portion in a direction toward the storage chamber, the elastic member extending through the entire storage chamber along an axis thereof from the top surface of the cover portion to the bottom end portion;
when attached to the top surface of the cover portion and the bottom end portion, the elastic member exerts sufficient elastic force to retain the bottom end portion to the storage chamber.

2. A feeder apparatus in accordance with claim 1, wherein the elastic member extends through a hole defined in the bottom end portion and is restrained proximate a bottom surface of the bottom end portion by a second restraining device proximate the second end of the elastic member so as to prevent the second end of the elastic member from sliding through the hole in the bottom end portion in a direction toward the storage chamber.

3. A feeder apparatus in accordance with claim 2, wherein the second restraining device is a knot tied in the elastic member.

4. A feeder apparatus, comprising:
a storage chamber having a cover portion with a top surface and at least one sidewall;
a bottom end portion; and
an elastic member extending through the entire storage chamber along an axis thereof and removably securing the cover portion of the storage chamber, the sidewall of the storage chamber and the bottom end portion to each other by an elastic resistance of the elastic member; the elastic member being attached at a first end to the top surface of the cover portion by a first restraining device and at a second end to the bottom end portion by a second restraining device, the first restraining device being in direct contact with the top surface of the cover portion,
wherein the elastic member is adapted to exert sufficient elastic force to retain the bottom end portion to the storage chamber.

5. A feeder apparatus, comprising:
a feed storage chamber having a cover with a top surface and at least one sidewall, a first opening being defined in the cover;
a feed tray having a bottom surface, a second opening being defined in the feed tray;
an elastic member having a first end and a second end, the elastic member extending through the first opening in the cover and the second opening in the feed tray, a first knot larger than the first opening being tied proximate the first end of the elastic member, the first knot retaining the first end of the elastic member to the top surface of the cover, the first knot being in direct contact with the top surface of the cover and thereby preventing the first end of the elastic member from sliding through the first opening in the direction of the feed storage chamber; a second knot larger than the second opening being tied proximate the second end of the elastic member, the second knot retaining the second end of the elastic member proximate the bottom surface of the feed tray and thereby preventing the second end of the elastic member from sliding through the second opening in the direction of the feed storage chamber; and
the elastic member extending through the entire feed storage chamber along an axis thereof and removably securing the cover of the feed storage chamber, the sidewall of the feed storage chamber and the feed tray to each other by an elastic resistance of the elastic member,
wherein the elastic member is adapted to exert sufficient elastic force to retain the feed tray to the feed storage chamber.

* * * * *